Dec. 7, 1954  H. WOLFE ET AL  2,696,064
EYE ASSEMBLY FOR USE IN DOLLS' HEADS
Filed May 3, 1951
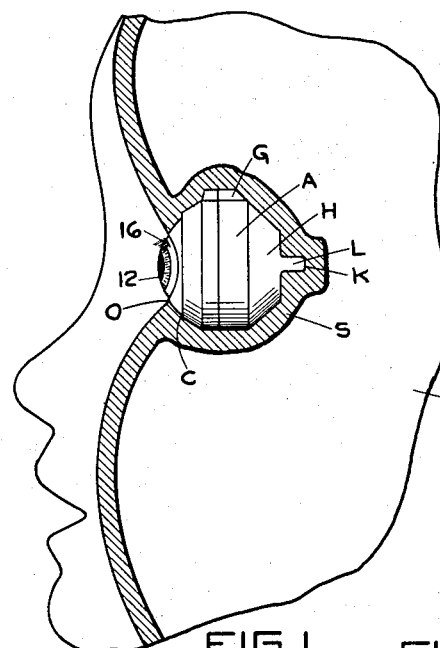
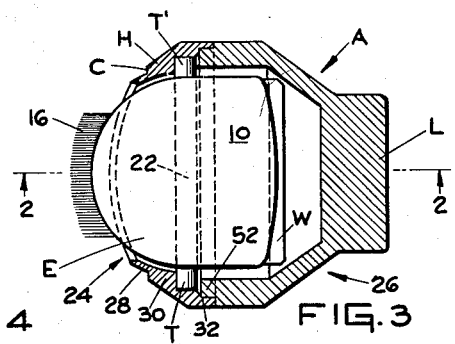
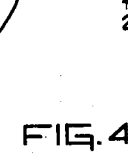
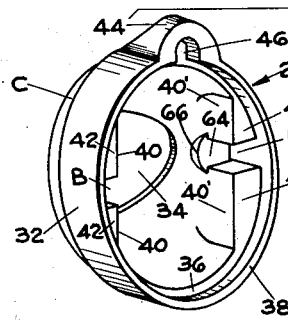
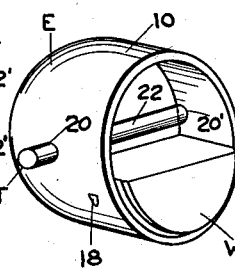
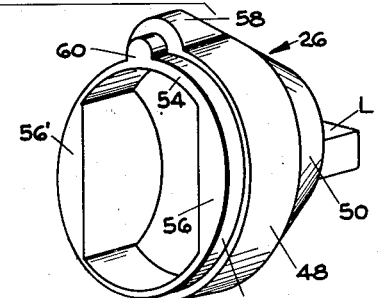
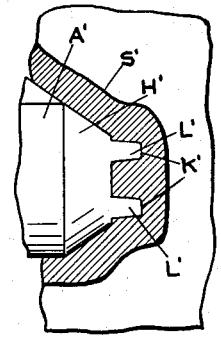
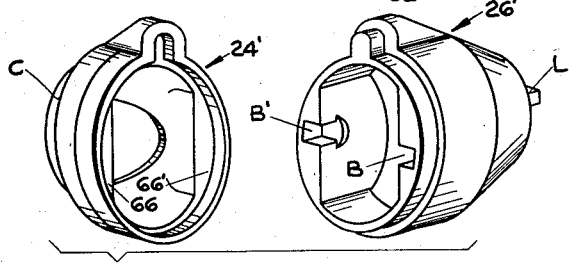
FIG. 1  FIG. 4  FIG. 3  FIG. 2
FIG. 5
FIG. 6
INVENTORS
HOWARD WOLFE AND
HANS W. SAMOLEWITZ
BY James and Franklin
ATTORNEYS

United States Patent Office 2,696,064
Patented Dec. 7, 1954

2,696,064

EYE ASSEMBLY FOR USE IN DOLLS' HEADS

Howard Wolfe, Harrington Park, and Hans W. Samolewitz, Bayonne, N. J., assignors to Margon Corporation, Bayonne, N. J., a corporation of New Jersey Application May 3, 1951, Serial No. 224,351

4 Claims. (Cl. 46—169)

The invention relates to flexible dolls' heads, and more particularly to movable or sleeping eyes therefor.

One of the most significant developments in the doll industry in recent years has been the greatly increased use of flexible dolls' heads. To a great extent, these heads are made by slush-molding vinyl compound slurries. The process is comparatively inexpensive and results in one-piece heads of extremely fine character detail having a soft, skin-like texture. The heads are then stuffed with a suitable filing material to supply greater body to the article.

The material used to stuff a doll's head interferes with the operation of the usual type of sleeping eye assembly, which includes a pendulum having a weight at the end thereof to supply the rotation or sleeping function of the eyes. It has, therefore, become desirable to provide an eye of suitable construction which operates in a protected area, or an area other than where the stuffing is located. This has led to the provision of individual eye sockets or receptacles in the head to receive the eye assemblies, the sockets usually being closed but for the eye openings. Dolls' heads formed in this manner require the eye assemblies to be inserted from the front or through the eye openings.

Inserting eye assemblies through the eye openings has given rise to numerous problems. The eye assembly must be constructed to permit the doll's head to rotate properly about the eye to furnish the desired sleeping action. The eye assembly must be constructed to facilitate its insertion through the smaller eye opening. It is important that the eye assemblies be inserted into the eye sockets in proper position, and be maintained or locked in such proper position so that the eyes will have a natural appearance.

One object of the present invention is to provide an eye assembly wherein the eye is easily, simply and properly assembled within an outer housing, which, with the doll, will be suitably rotatable about the eye, and will protect the eye against shock and the compressive forces of the elastic material forming the socket.

Another object of the invention is to provide the eye housing with means to facilitate its insertion into the eye socket through the smaller eye opening.

Still another object of the invention is to provide the eye housing with aligning and guiding means so that it will be inserted into the socket in properly oriented position.

A further object of the invention is to ascertain that the eye assembly is correctly located within the eye socket of the head, and to lock or key the eye assembly in correct position.

These and other objects of the invention will be apparent from the following detailed description taken with the accompanying drawing, wherein:

Fig. 1 is a vertical section taken through one of the eye sockets of a flexible doll's head molded in accordance with the present invention;

Fig. 2 is a vertical view, partly in section, of an eye assembly made in accordance with the present invention, taken approximately in the plane of line 2—2 of Fig. 3;

Fig. 3 is a horizontal view, partly in section, taken approximately in the plane of line 3—3 of Fig. 2;

Fig. 4 is an exploded, perspective view of the parts of the eye assembly shown in Figs. 2 and 3;

Fig. 5 is a perspective view of the parts of a modified eye housing; and

Fig. 6 is a fragmentary partially sectioned view of a doll's head and eye assembly illustrating another modification.

Referring to the drawings, particularly Fig. 1, a doll's head D is molded of a suitable plastic material and, at the same time, eye sockets S (only the nearer one of which is visible) are molded within the head. The doll's head is molded with eye openings O through which eye assemblies A are inserted. A preferred form of apparatus for inserting an eye assembly into a socket is described in our application, Serial No. 224,352, filed May 3, 1951, having the same assignee as the present invention.

In all forms of the invention shown, the eye assembly A comprises an eye E and a housing H (Figs. 2–4). The eye has a weight W secured therein, and is provided with a pair of diametrically oppositely extending trunnions T and T'. The eye is pivotally mounted within the housing H to furnish the desired sleeping effect by placing the trunnions T and T' in bearings B and B' (Figs. 4 and 5) formed in the housing.

The front outside surface of the housing H is formed with a ledge or step C (Figs. 1, 2 and 5) to provide an abutting surface against which a suitable pusher element may be pressed to facilitate insertion of the eye assembly into an eye socket. Also, the outer periphery of the housing H is provided with guiding means G to align and guide the eye assembly as it is being inserted into the socket to thereby properly position and orient the eye assembly within the socket or head. Suitable means for accomplishing the insertion and guiding are disclosed in the aforesaid companion patent application. To assure that the eye assembly is correctly located and oriented within the eye socket, and to lock the eye assembly in such position, the housing H is provided with locking or keying means L at the rear thereof. The inner end of the eye socket S is formed or molded with a recess or keyway K predeterminedly located in the socket to receive the locking means L.

Referring to Figs. 1 through 4 for one specific embodiment of the invention, the eye E comprises a substantially hollow, metal shell 10 within which is secured a lens 12 (see Figs. 1 and 2), which simulates the iris and pupil. The eye shown is generally described in the patent to Marcus, 2,254,232, granted September 2, 1941. The shell 10 may be slotted at 14 to receive an eyelash 16, which protrudes through the slot, and the base of which is cemented to the inside of the shell. The shell is flesh colored above the eyelash to simulate an eyelid. The weight W, which may be made of lead, or other material of suitable mass, is secured within the lower inside part of the shell by striking small sections 18 of the shell into the weight. The shell 10 is provided with diametrically opposite apertures 20 and 20' through which a shaft 22 is passed. The ends of the shaft protrude outside the shell and provide the trunnions T and T'.

The eye E may be made in other suitable ways. Instead of providing a plastic lens for the metal shell 10, the entire eye may be made of metal, and the simulation of the pupil, iris and eyelid may be printed directly on the metal. If desired, the entire shell 10 may be made of plastic instead of metal. Also, the lens and the shell may be integrally molded in one piece from plastic material. Instead of using a separate shaft to provide the trunnions T and T', such trunnions may be molded as integral parts of a molded plastic or die-cast metal shell. Also, instead of separately forming the weight and securing same within the shell, the weight may be molded or cast as an integral part of the shell.

As shown in Figs. 2, 3 and 4, the eye housing H is split or formed in two parts, preferably, though not necessarily, a front housing member 24 and a rear housing member 26. The division or splitting of the housing into two separable parts facilitates enclosing the eye within the housing, and the trunnions within the bearings. Preferably, the two members are molded of a suitable plastic material.

The front housing member 24 is formed with a front portion 28, an intermediate portion 30 and a rear portion 32. The outside diameter is abruptly stepped between the front portion 28 and the intermediate portion 30, thereby providing the flat annular ledge C at their juncture. The rear portion 32 has a larger outside diameter than the intermediate portion 30 and is shaped to provide a cylindrical rim. The extreme front portion 28 is provided with an eye opening 34, which may be formed at the time the housing member is molded. If desired, the opening 34 may be made by punching out the desired section of material in the otherwise closed face of a molded member. The desired portion of the eye E is visible through the opening 34. The inside dimension of the front housing member is slightly larger than the outside dimension of the eye, providing clearance for relative rotation.

As shown in Fig. 4, the inside of the front housing member 24 is molded to provide a circular ledge 36 located upon the inside of the cylindrical rim portion 32. The ledge 36 is set inwardly a short distance from the extreme outer edge 38 of the rim portion 30. The inside of the housing member is also provided with thickened areas 40 and 40' at diametrically opposite sides, thereby providing the enlarged ledge surfaces 42 and 42'. Rearwardly opening bearing slots are formed in the thickened portions to provide the bearings B and B' for receiving the trunnions T and T' of the eye. Upon the outside surface of the cylindrical rim part 32, a lug or boss 44 is molded. A semi-cylindrical recess 46 is molded within the boss to open to the rear of the housing member 24.

As also shown in Fig. 4, the rear housing member 26 comprises a front cylindrical portion 48 and a rear portion 50 of decreasingly tapered diameter, onto the closed bottom of which a bar-like extension is molded to act as the locking means L. The wall thickness on the forward open side of the cylindrical part 48 is reduced to form a ring wall 52 having a forward edge 54. The edge 54 is provided with relatively wide or thickened portions 56 and 56' at diametrically opposite sides. A lug or boss 58 is molded on the cylindrical portion 48, and a smaller semi-cylindrical boss 60 is molded adjacent thereto and on the ring wall 52.

The inside surface of the rear housing member is tapered at such an angle that a stop 62 (see Fig. 2) will be provided for the eye E when assembled within the front and rear housing members. The parts are dimensioned so that the bottom edge of the weight W contacts the stop portion 62 to bring the iris and pupil of the eye member in alignment with the opening 34 when the doll head is held in upright position.

In order to better centralize the eye member within the housing and to minimize any friction therebetween, the end face 64 of each of the bearing slot walls has small added projections 66 (only one of which is visible in Fig. 4). In this manner, minimum points of contact between the eye and the housing are provided. Also, the projections 66 are placed at the desired center of rotation so that the eye will quickly respond to any change of position of the doll.

To assemble the eye E and its weight W within the housing H, the trunnions T and T' are placed in the bearing slots B and B' of the front housing member 24. The rear housing member is then press-fitted into the front housing member. The parts are suitably dimensioned so that the ring wall 52 snaps into place, fitting snugly within the cylindrical rim 32 of the front housing member. As shown in Fig. 2, the boss 60 is received within the recess 46, thereby acting as cooperating aligning means which properly relate the front and rear members, and which align the outside bosses 44 and 58. When the assembly is made, the thickened portions 56 and 56' abut against the ledge surfaces 42 and 42' to provide the bearing surfaces which close off the otherwise open bearing slots B and B', as shown in Fig. 3. Thus, the described construction serves to align the housing members in desired relative position so that the bearing surfaces close off the bearing slots, and the ends of the trunnions are spaced inwardly from the outer periphery of the assembled housing, and in addition, the bosses 44 and 58 are aligned to provide a single continuous longitudinally extending projection which acts as the guiding means G previously mentioned.

The eye assembly A is now ready to be inserted into the eye socket S through the eye opening O. By spreading the eye opening and utilizing the guiding means G, the eye assembly may be guided into the socket as it is being inserted until the locking means L is received within the mating keyway K formed at the end of the socket. Thus the correct positioning and orientation of the eye assembly within the socket is assured, with the eye openings in registration. The guide G and the key L supplement one another. Either may be used alone, as well as both together as here shown. However, the guide G acts primarily to properly orient the eye assembly in the head, and it makes certain, for example, that the operating weight of the eye is at the bottom as it should be, instead of at the top. The key L, when located diametrically as here shown, would not alone prevent an upside down position of the eye assembly. It locates or keys the eye assembly in exact position with the eye openings of the assembly and the head in exact registration. It is therefore preferable to employ both the guide and the key, yet by locating the key in an offset position, it could serve both purposes. The guide G, however, has an additional advantage when using the apparatus disclosed in our companion application previously referred to, for it then acts as a guide during the entire downward passage of the eye assembly through the apparatus into the head.

The inside dimensions of the socket are made smaller than the outside dimensions of the eye assembly, so that the socket material will frictionally grip the assembly to prevent any possibility of displacement. With the eye assemblies now properly positioned in the eye sockets, when the doll is moved from an upright to a horizontal or sleeping position, the eye housings will be moved with respect to the rotatably mounted eyes, causing the flesh colored eyelid parts of the eyes above the lashes to appear through the aligned eye openings of the housings and the doll's head.

A modification of the invention is shown in Fig. 5. In this form of the invention, the open bearings B and B' are formed in the rear housing member 26' instead of the front housing member, as shown in Figs. 2, 3 and 4. The front housing member 24' is provided with ledges 66 and 66' to close off the bearings and prevent the escape of the trunnions for the eye, the ends of the trunnions being spaced inwardly from the outer periphery of the assembled housing. It will be understood, of course, that the front and rear housing members 24' and 26' are relatively dimensioned to locate the bearings B and B' in the desired plane of rotation for the eye.

Another modification is shown in Fig. 6. There the means on housing H' for keying the eye assembly A' within the socket S' may comprise a pair of keys L' on the assembly received in a mating pair of spaced recesses K' formed in the socket. In general, any suitable key means in the cooperating surfaces of the eye housing and the socket may be utilized.

It is believed that the construction of the doll's head and the eye assembly of our invention, and their relationship to one another, as well as the advantages thereof, will be apparent from the foregoing detailed description. It will also be apparent that while we have shown and described our invention in several preferred forms, changes may be made in the structures disclosed without departing from the scope of the invention, as sought to be defined in the following claims. In the claims the reference to "open bearings" or "open bearing slots" on one housing member and "bearing surfaces" on the other housing member for "closing off" the open bearings, is not intended to exclude the special limiting case of a bearing which is split diametrically.

We claim:

1. A doll's eye assembly for use in a flexible, rubber-like head having individual substantially enclosed eye sockets within the head to receive independent unconnected eye assemblies, said sockets having eye openings at the front of the head, said eye assembly comprising an eye provided with a weight, said eye having a pair of oppositely extending trunnions, and a pair of housing members assembled to enclose said eye and weight and having an opening to expose a part of the eye, one of said housing members having a pair of spaced, open bearings for receiving said trunnions, and the second housing member being provided with bearing surfaces for closing off said open bearings when the members are assembled, the ends of said trunnions being spaced inwardly from the outer periphery of the assembled housing, the division of said housing members being on a plane near the trunnions, and said assembled housing being so dimensioned as to be received within the eye sockets of the head.

2. A doll's eye assembly for use in a flexible, rubber-like head having individual substantially enclosed eye sockets within the head to receive independent unconnected eye assemblies, said sockets having eye openings at the front of the head, said eye assembly comprising an eye provided with a weight, said eye having a pair of oppositely extending trunnions, and front and rear housing members assembled to enclose said eye and weight, the front housing member being provided with an opening to expose a part of the eye, one of said housing members having a pair of spaced, open bearing slots for receiving said trunnions, the second housing member being provided with bearing surfaces for closing off said open bearing slots when the members are assembled, the ends of said trunnions being spaced inwardly from the outer periphery of the assembled housing, the division of said housing members being on an upright plane near the trunnions and said assembled housing being so dimensioned as to be received within the eye sockets of the head.

3. A doll's eye assembly for use in a flexible, rubber-like head having individual substantially enclosed eye sockets within the head to receive independent unconnected eye assemblies, said sockets having eye openings at the front of the head, said eye assembly comprising an eye provided with a weight, said eye having a pair of oppositely extending trunnions, front and rear housing members assembled to enclose said eye and weight, the front housing member being provided with an opening to expose a part of the eye, one of said housing members having a pair of spaced, open bearing slots for receiving said trunnions, the second housing member being provided with bearing surfaces for closing off said open bearing slots when the members are assembled, the ends of said trunnions being spaced inwardly from the outer periphery of the assembled housing, and cooperating aligning means provided on both housing members for locating the bearing surfaces of the second member against the open bearing slots of the first member, the division of said housing members being on an upright plane near the trunnions, and said assembled housing being so dimensioned as to be received within the eye sockets of the head.

4. A doll's eye assembly for use in a flexible, rubber-like head having individual substantially enclosed eye sockets within the head to receive independent unconnected eye assemblies, said sockets having eye openings at the front of the head, said eye assembly comprising an eye provided with a weight, said eye having a pair of oppositely extending trunnions, front and rear housing members assembled to enclose said eye and weight, the front housing member being provided with an opening to expose a part of the eye, one of said housing members having a pair of spaced, open bearing slots for receiving said trunnions, the second housing member being provided with bearing surfaces for closing off said open bearing slots when the members are assembled, the ends of said trunnions being spaced inwardly from the outer periphery of the assembled housing, the division of said housing members being on an upright plane near the trunnions, and said assembled housing being so dimensioned as to be received within the eye sockets of the head, and means provided on at least one of said housing members for guiding the eye assembly as it is being mounted within a doll's head with the trunnion axis properly oriented relative to the head.

References Cited in the file of this patent

UNITED STATES PATENTS

| Number | Name | Date |
|---|---|---|
| 1,859,321 | Wilhelm | May 24, 1932 |
| 2,039,928 | Popovich | May 5, 1936 |
| 2,520,491 | Bunin | Aug. 29, 1950 |
| 2,546,682 | Wilhelm | Mar. 27, 1951 |
| 2,566,111 | Baggott | Aug. 28, 1951 |
| 2,590,515 | Derham | Mar. 25, 1952 |
| 2,603,762 | Goodchild | July 15, 1952 |

FOREIGN PATENTS

| Number | Country | Date |
|---|---|---|
| 543,756 | Great Britain | Mar. 11, 1942 |
| 575,139 | Great Britain | Feb. 5, 1946 |